May 30, 1933.  G. E. BIGELOW ET AL  1,911,422
PACKING STRUCTURE FOR TURBINE PUMPS
Filed Feb. 16, 1931
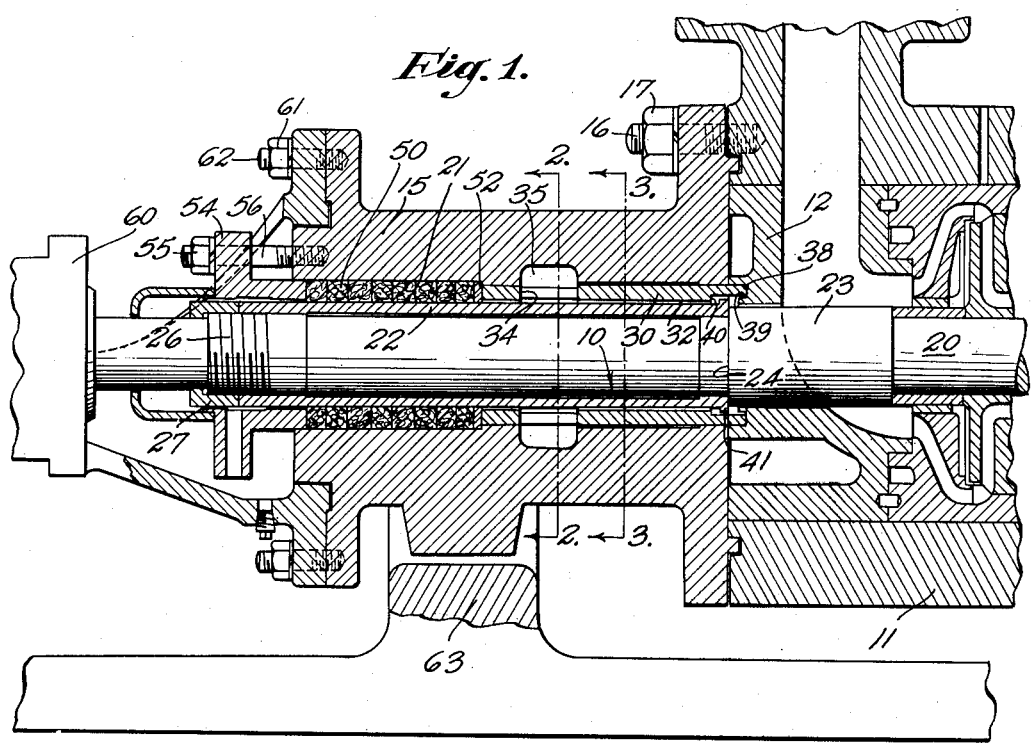
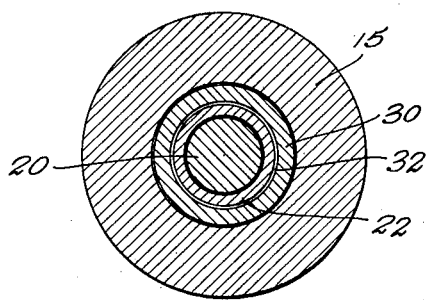
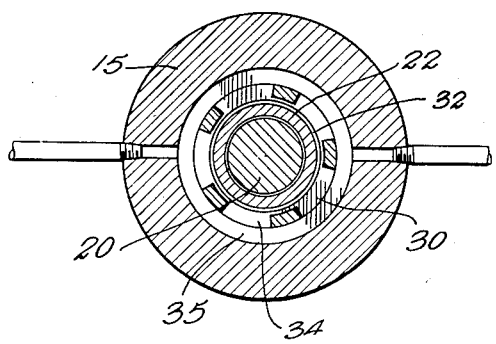
INVENTORS:
George E. Bigelow
Arthur R. Weis
By
ATTORNEY.

Patented May 30, 1933

1,911,422

UNITED STATES PATENT OFFICE

GEORGE E. BIGELOW, OF SOUTHGATE, AND ARTHUR R. WEIS, OF HUNTINGTON PARK, CALIFORNIA, ASSIGNORS OF ONE-HALF TO PACIFIC PUMP WORKS, OF HUNTINGTON PARK, CALIFORNIA, A CORPORATION OF CALIFORNIA

PACKING STRUCTURE FOR TURBINE PUMPS

Application filed February 16, 1931. Serial No. 516,063.

Our invention relates to a novel construction of a packing or sealing device which finds particular utility in combination with a hot-oil turbine pump.

It is an object of the present invention to provide an improved sealing means in which the wearing parts may be readily removed for inspection.

A further object of the invention is to provide a sealing means including a shaft sleeve secured to the shaft in such a manner that there is no danger of this sleeve becoming loose under adverse conditions.

A further object of the invention is to provide a novel structure forming a throttle passage, this structure including a pair of sleeves which may be withdrawn from a cavity of the pump for ready inspection.

A further object of the invention is to provide a sealing structure including a sleeve which is compressed against an insert member of the pump, and a structure in which this compression takes place through the action of a packing means.

Further objects and advantages of the invention will be made evident hereinafter.

In the drawing,

Fig. 1 is a sectional view illustrating one end of a turbine pump including the sealing device of our invention.

Figs. 2 and 3 are sectional views taken on the lines 2—2 and 3—3 respectively.

Referring particularly to Fig. 1, the sealing device is indicated in general by the numeral 10 and is shown associated with the turbine pump including a pump shell 11 enclosing inserts 12, certain of which cooperate in forming impeller chambers in which the pump impellers are positioned. The details of this structure do not form a part of the present invention. A head member 15 is bolted to the pump shell 11 by the use of studs 16 on which nuts 17 are threaded.

The impellers of the pump are secured to a shaft 20 which extends outward through a cavity 21 of the head member 15, this shaft cooperating with a shaft sleeve 22 in forming a rotatable member. The shaft 20 is formed with an enlarged portion 23 including a shoulder 24 against which the shaft sleeve 22 abuts. This sleeve extends completely through the cavity 21 and forms a sliding fit with the shaft 20, it being preferable to relieve both the surface of the shaft and the inner surface of the shaft sleeve 22 at the central portion thereof so that the shaft sleeve contacts the shaft only at its inner and outer ends, as shown. The outer end of this sleeve is threaded to the shaft as indicated by the numeral 26, whereby the inner end of the sleeve may be forced into abutting relationship with the shoulder 24. A lock nut 27 is also secured to the shaft and engages the shaft sleeve 22 in locking relationship.

It will be noted that the shaft sleeve 22 is formed of a unitary member extending completely through the cavity 21, as distinguished from sleeves previously used in this connection, wherein the shaft sleeve may extend only partially through the cavity, the locking means being in the form of another sleeve extending partially through the cavity. Such a locking sleeve is ordinarily contacted by a packing positioned therearound, and in the event that the pump is turned in a reversed direction the friction between the locking sleeve and the packing may be sufficient to unscrew this sleeve. With the present construction no such difficulty arises, in view of the fact that the lock nut 27 is positioned entirely out of the cavity 21.

Slidably retained in the cavity 21 is a stationary or outer sleeve 30. The inner wall of the cavity 21 is relieved intermediate the ends of this outer sleeve so that the sleeve contacts the walls only at its ends, thereby permitting easy withdrawal thereof, as will be hereinafter described. The inner diameter of the outer sleeve 30 is slightly larger than the outer diameter of the shaft sleeve 22 so as to define an annular throttle space 32 therebetween. The inner end of this trottle space communicates with a high-pressure region inside the pump shell 11, and the outer end thereof communicates with openings 34 formed in the outer sleeve, these openings being aligned with a chamber 35 of the head member 15 when the sleeve 30 is in an innermost position, as shown in Fig. 1. An escape of fluid thus takes place through the throttle 32, and, as described in our copending application filed Feb. 16, 1931, Serial No. 516,064, it is desirable to circulate a liquid through the chamber 35, maintaining the pressure therein at a value different from the pressure in the high-pressure region of the pump shell with which the throttle space 32 communicates. The present structure, however, is of novel form, regardless of whether or not such a liquid is circulated through the chamber 35.

The inner end of the stationary or outer sleeve 30 is provided with a pair of lugs 38 which extend into corresponding depressions 39 of the insert 12 immediately adjacent the head member 15. This prevents any rotation of the sleeve 30, and also allows this sleeve to abut against this insert member. The inner end of the sleeve 30 is also counterbored to provide a shoulder 40, while the inner end of the shaft sleeve 22 provides an extension 41 loosely fitting into the counterbore and adapted when the sleeve 22 is withdrawn leftward to engage the shoulder 40 and draw the sleeve 30 leftward therewith.

The outer end of the cavity 21 is sealed with respect to the shaft sleeve 22 by means of a packing 50. This packing may directly engage the outer end of the sleeve 30 or a washer 52 may be interposed therebetween, this washer sliding freely in the cavity and surrounding the shaft sleeve 22. The packing 50 is compressed in the outer end of the cavity 21 through the action of a gland 54 which may be moved axially into the cavity by rotation of nuts 55 threaded to studs 56 in the usual manner. Moving this gland 54 to the right brings the sleeve 30 into abutting relationship with the insert 12, after which a further movement of the gland 54 will compress the packing 50 around the shaft sleeve 22 to any desired extent.

The shaft 20 extends leftward beyond the head member 15 and is journalled in a bearing structure indicated by the numeral 60 of Fig. 1, this bearing structure being secured to the end of the head member 15 by bolts 61 threaded to studs 62. The complete pump is supported on a base including a pedestal 63 which engages a portion of the head member 15, so that the complete bearing structure 60 may be removed without disturbing the remainder of the pump by merely removing the bolts 62.

Once the bearing structure is removed the entire sealing device may be disassembled by removing the lock nut 27, the gland 54, and packing 50, after which the shaft sleeve 22 may be withdrawn leftward from the cavity. This movement of the shaft sleeve 20 will draw the outer sleeve 30 therewith, as previously described, thus permitting these sleeves to be readily inspected, and, if necessary, replaced.

It will thus be apparent that the lock nut 27 is not engaged by the packing 50 and that there is thus no danger of the lock nut being unscrewed should the rotation of the pump shaft be accidentally reversed.

Another important feature of the invention is the fact that the sleeves defining the throttle space may be withdrawn from the cavity 21 as a unit. It has heretofore been necessary to disconnect the head member 15 from the pump shell 11 in order that such inspection may be effected.

So also, the utilization of the openings 34 formed through the outer sleeve 30 is an important detail of the invention and provides a structure which is both simple and effective.

We claim as our invention:

1. In combination with a turbine pump providing a pump shell and a head member, said head member providing a cavity: a shaft extending from said shell through said cavity; rotatable and stationary walls separated from each other to define an annular throttle space around said shaft and communicating with a high-pressure region of said pump shell; and means for simultaneously withdrawing said walls from said cavity in a direction away from said pump shell.

2. In combination with a turbine pump providing a pump shell and inserts therein: a head member providing a cavity therein; a rotatable member extending through said cavity; an outer sleeve in said cavity around said rotatable member and removable from the outer end of said cavity, said outer sleeve engaging one of said inserts when in an inner position; and means for sealing said outer end of said cavity relative to said rotatable member.

3. In combination with a turbine pump providing a pump shell and inserts therein: a head member providing a cavity therein; a rotatable member extending through said cavity and comprising a shaft and a shaft sleeve secured thereto; an outer sleeve in in the inner end of said cavity and being larger in diameter than said shaft sleeve to define an annular passage therearound communicating with the interior of said pump shell, said outer sleeve engaging one of said inserts when in an inner position; packing means in the outer end of said cavity and being removable to permit withdrawal of said outer sleeve, said packing means sealing said shaft sleeve and said head member; and inter-engaging means acting between said sleeves when said shaft sleeve is moved outward a distance for withdrawing said outer sleeve from said cavity when said shaft sleeve is moved the remainder of the way therefrom.

4. In combination in a hot-liquid turbine pump providing a pump shell and a head member, said head member providing a cavity: a shaft extending from said pump shell through said cavity; a shaft sleeve around said shaft in said cavity and removable axially from said cavity; an outer sleeve around said shaft sleeve and axially movable in said cavity until the inner end thereof engages a stationary portion of said turbine pump, said outer sleeve and said shaft sleeve cooperating to define an annular throttle space; and means for forcing said outer sleeve into said cavity until said inner end thereof engages said stationary portion.

5. In combination in a hot-liquid turbine pump providing a pump shell and a head member, said head member providing a cavity: a shaft extending from said pump shell through said cavity; a shaft sleeve around said shaft in said cavity and removable axially from said cavity; an outer sleeve around said shaft sleeve and axially movable in said cavity until the inner end thereof engages a stationary portion of said turbine pump, said outer sleeve and said shaft sleeve cooperating to define an annular throttle space; walls defining a chamber around said shaft and on which chamber said annular throttle space opens; means for introducing liquid into said chamber; means for withdrawing liquid from said chamber at such rate as to maintain a pressure in said chamber; packing means in said cavity for sealing the pressure in said chamber from the atmosphere; and means for forcing said packing against said outer sleeve to force said outer sleeve into said cavity until said inner end thereof engages said stationary portion.

6. A combination as defined in claim 4 including means cooperating with said outer sleeve and with a stationary portion of said pump for preventing rotation of said outer sleeve in said cavity.

7. In combination in a hot-liquid turbine pump: a pump shell; a head member providing a cavity therein; a shaft extending from said pump shell through said cavity; a shaft sleeve secured to said shaft and extending through said cavity and to a point adjacent the interior of said pump shell; an outer sleeve in said passage and extending inward to a point adjacent the inner end of said shaft sleeve to abut against a stationary portion of said pump; inter-engaging means between said outer sleeve and said stationary portion to prevent rotation of said outer sleeve in said cavity; inter-engaging means acting between said shaft sleeve and said outer sleeve to withdraw said outer sleeve from said cavity when said shaft sleeve is removed therefrom; and sealing means for sealing the outer end of said cavity with respect to said shaft sleeve.

8. In combination in a hot-liquid turbine pump; a pump shell; a head member providing a cavity therein; a shaft extending from said pump shell through said cavity; a shaft sleeve secured to said shaft and extending through said cavity, there being a shoulder on said shaft adjacent the interior of said pump shell and against which said shaft sleeve abuts; an outer sleeve in said cavity around the inner portion of said shaft sleeve and spaced therefrom to form an annular throttle space, said outer sleeve providing a counterbore communicating with the interior of said pump and with said annular throttle space; an extension on said shaft sleeve and fitting into said counterbore whereby removal of said shaft sleeve from said cavity also removes said outer sleeve; discharge means communicating with the outer portion of said annular throttle space; and sealing means around said shaft sleeve between said discharge means and the outer portion of said cavity.

In testimony whereof, we have hereunto set our hands at Los Angeles, California, this 11th day of February, 1931.

GEORGE E. BIGELOW.
ARTHUR R. WEIS.